United States Patent [19]
Davis, Jr.

[11] 3,864,580
[45] Feb. 4, 1975

[54] CHRISTMAS TREE LIGHTING CONTROL
[76] Inventor: George B. Davis, Jr., 7512 Marbury Rd., Bethesda, Md. 20034
[22] Filed: Nov. 23, 1973
[21] Appl. No.: 418,262

Related U.S. Application Data
[63] Continuation-in-part of Ser. No. 342,433, March 19, 1973, now Patent No. 3,812,380 and Ser. No. 338,832, March 7, 1973, now Patent No. 3,808,450.
[52] U.S. Cl. ................. 307/31, 315/185 S, 323/97
[51] Int. Cl. ............................................. H02j 3/00
[58] Field of Search ........ 315/185 S, 121, 123, 126, 315/127, 128; 323/96.7, 97, 94; 307/11, 31, 134

[56] References Cited
UNITED STATES PATENTS
2,096,017   10/1937   Williams ........................ 323/97 X
2,646,489   7/1953   McArron ............................ 323/7

Primary Examiner—Herman J. Hohauser

[57] ABSTRACT

A Christmas tree lighting control wherein a plurality of voltages are applied individually and in a predetermined sequential order to all the lights of a tree to produce a twinkling and shimmering effect heretofore unobtainable by any form or combination of conventional flasher apparatus.

15 Claims, 2 Drawing Figures

CHRISTMAS TREE LIGHTING CONTROL

This application is a continuation-in-part of application Ser. No. 342,433, Mar. 19, 1973, now Patent No. 3,812,380 issued May 21, 1974 and application Ser. No. 338,832, Mar. 7, 1973, now Patent No. 3,808,450 issued April 30, 1974.

This invention relates generally to Christmas tree lighting and more particularly to a Christmas tree light varying voltage control that, when in operation, applies a continually changing voltage to all the lights of a tree and in a predetermined manner to produce a twinkling or shimmering effect rather than the conventional method of making and breaking the circuit through the lamps to produce a flashing or by so reducing the voltage thereto as to produce a similar flashing result.

With the increasing desire of the public for movement or action in Christmas tree lighting, the use of string flashers or individual flasher bulbs has become widely accepted. While such devices do relieve the lifelessness of a lighted tree, the violent action of flashing lights can become quite annoying particularly when such flashing affects the entire string. This is generally the case even when not looking directly at the tree. The on and off of any light source within a room, such as the flashing of tree lights, can become quite distracting. This is particularly true when the flashing of two or more strings reach a condition of synchronization so as to flash simultaneously. Such a condition will invariably occur when any flasher apparatus operates individually whether in bulbs or strings.

It is an object of the present invention to provide a new and improved Christmas tree lighting control which, when in operation, applies a plurality of continually changing voltages to all the lights of a tree and in a predetermined order.

A further object is to provide a voltage control for Christmas tree lighting wherein the circuits to the lights are never interrupted to cause flashing, but is applied as a continually changing voltage to produce slight changes in light intensity and in such a manner as to effect a twinkling or shimmering of the lights of the entire tree.

A still further object is to provide a Christmas tree lighting control that will apply varying voltages to a plurality of Christmas tree lighting strings simultaneously and in a manner to produce a coordination of lighting effects between the individual strings without materially varying the overall light intensity of the system.

A further object is to provide a voltage control for Christmas tree lights preferably of the miniature series wired type and, if desired, may be used in combination with individually flashing bulbs.

In order that this invention may be more readily understood, reference is now made to the accompanying drawings wherein.

Figure 1:
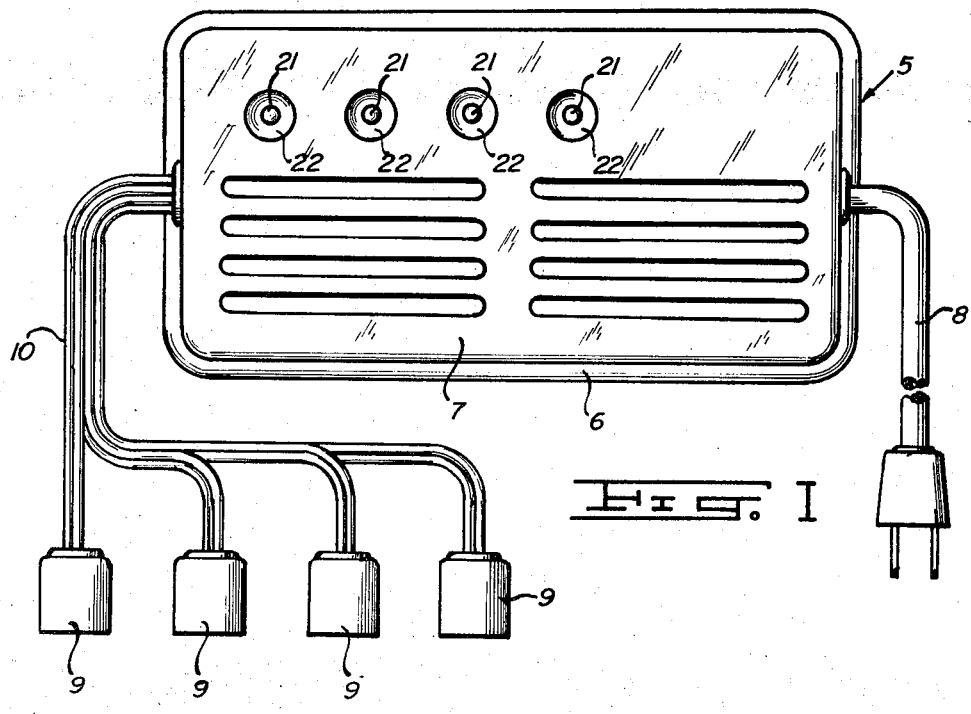
FIG. 1 is a plan view in elevation of the device of the invention.

Referring now to the drawings, and more particularly to FIG. 1 thereof, wherein is shown the assembled device of the present invention and as will be generally designated 5 and to which may be connected strings of Christmas tree lights with the lights being preferably of the series wired miniature type. The assembly 5 includes a mounting base 6 to which the perforated cover 7 is attached and wherein is enclosed the working mechanism of the device. The connector and power supply cord 8 provides means for electrically connecting the device to a conventional 110 volt a.c. power supply source.

Extending from the end of the cover in the manner shown, is a number of electrical outlets 9 and into which, when in use, strings of Christmas tree lights are plugged. The lead wires 10 to the various outlets may be of any length desired, preferably, sufficiently long as to extend well into the tree for easy access to the lighting strings while allowing the control to rest beneath the tree or possibly some distance away.

Figure 2:
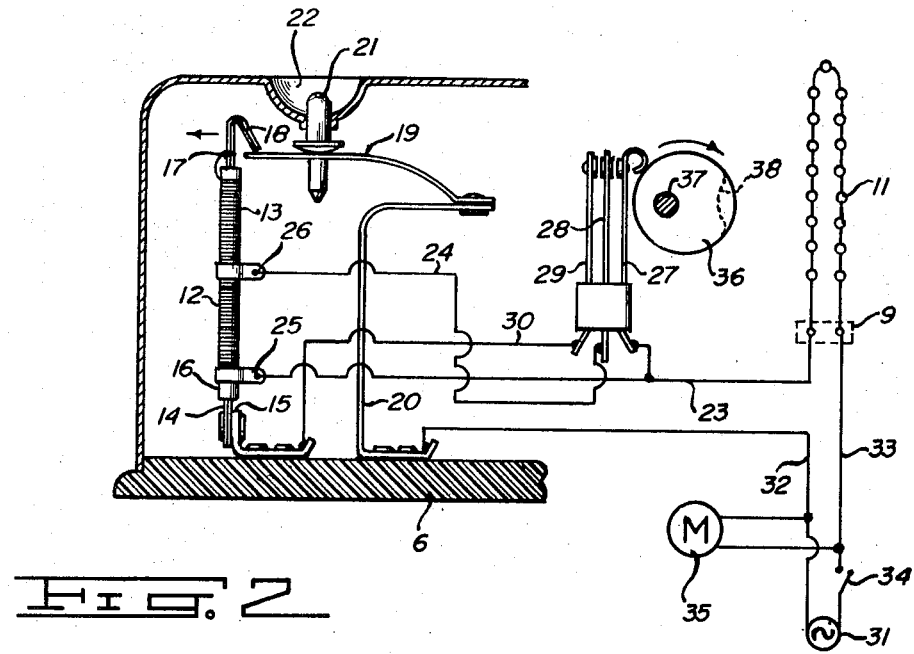
FIG. 2 is a view partly cut away and partly in elevation and showing the electrical circuitry of the invention as mounted within the case as shown in FIG. 1.

FIG. 2 shows the arrangement of the voltage control as mounted within the case 7 and its relation electrically to the Christmas tree lighting string 11 to which it is connected by the outlet 9. The device includes resistor elements 12 and 13 which are preferably formed as a continuous winding about a bimetallic strip 14 secured by bracket 15 to the insulating base 6 of the device. Insulation 16 electrically isolates the resistors from the strip 14 except at point 17 whereupon the bare wire of the resistor is wound about the strip to make electrical connection therewith at the position shown.

Formed upon the free end of the strip 14 is a bent-down tang like member 18 so located as to extend over and maintain in a depressed position a spring contact finger 19 secured to the base 6 as by bracket 20. A plastic reset button 21 extends downward through the cover depression 22 and through the contact finger 19 to depress the finger for electrical reset if released from the tang by thermal movement of the strip 14, as will hereafter be more fully described.

Connected by leads 23 and 24 to the resistor sections at point 25 and 26, are flexible contact members 27 and 28 respectively which form part of the circuit controlling elements of the control. The third flexible contact member 29 is electrically connected directly to the bimetallic strip 14 by way of lead 30 and bracket 15 in the manner shown.

In operation of the device thus far described, current is supplied by way of the power source 31 to leads 32 and 33 which, after switch 34 is thrown, starts the operation of a back-geared motor device 35 having a shaft speed, desirably, of from 2 to 5 revolutions per minute. The motor drives the cam 36 of the control by way of shaft 37. With the closing of switch 34, circuit is likewise completed to the lamp string 11 by way of lead 23 after having passed through the bracket 20, the contact finger 19 and the two resistor sections 13 and 12. With both resistor sections now in the lighting circuit, the lamps of the string are now at their lowest stage of brightness with say approximately 65 volts being applied thereto.

Spring contact member 27 which, by reason of the shown position of cam 36, is now in open circuit with respect to the spring contact member 28. As the cam is rotated, this lowest voltage contact member 27 is forced by cam motion into electrical engagement with the contact member 28 to effect a shorting out of the resistor sections 12 to cause a noticeable increase in brightness in the lamps by now applying thereto a higher voltage of approximately 90 volts. Further rotation of the cam drives all of the contact members 27, 28, and 29 electrically together to short out both resistor sections 12 and 13 to effect full brightness in the lamps by applying line voltage thereto by way of the bimetallic strip 14 and contact finger 19. Further rotation of the cam starts movement of the contact apart and with the separation of the three contact members 29, 28, and 27 one cycling operation of the device has been completed.

The configeration of the cam, as shown by the example 38, may be selectively varied between the four controls to produce a more random lighting effect throughout the lights of a tree. The operating interval between such light intensity changes should preferably be between 2 and 3 seconds, however, this may be varied selectively depending upon the design of the cam relative to the motor speed. The contacts members 27, 28, and 29 may be closed and opened in any sequence required to produce the desired effect. The cams of the four controls of the device are independently adjusted with respect to each other to preferably prevent any light intensity changes between independently connected strings occuring simultaniously. This difference in the cams and their settings along with possible small variations in the resistors between controls, will produce an overall shimmering and twinkling of the lights of a tree that is very pleasing and restful to observe and totally unobtainable by any form of independently operating device, such as, for example, a conventional flasher mechanism.

The device of the present invention is primarily designed for use with low current Christmas tree lights of the series wired miniature type and with resistors elements 12 and 13 being such as to produce the necessary voltage drop without overheating providing that only one or possibly two such miniature lighting strings are plugged into a single outlet of the device. However, if the electrical load upon the resistors is too great, as by plugging into one of the outlet of the device a greater number of strings then intended or attempting to connect therewith a large string of parellel wired lamps, the resistor elements will overheat to cause deflection of the bimetallic strip 14 from its contact with the finger 19 to free the latter allowing it to snap to its open circuit position with respect to the strip 14. Holding down the reset button 21 will not damage the mechanism which connot be reset for operation until the overload upon the line has been eleviated.

While the operating voltages as heretofore designated at 65, 70 and 110 volts has proven satisfactory, it is understood that these voltages may be altered to produce any lighting affect desired. The basic requirement being, and which it is specifically intended by the present device to prevent, is to so reduce the voltage to the string as to produce what will appear as a flashing of the lamps. Further, while the device has provided for three distinct light intensity changes and which has been found most satisfactory, it is understood that two or four or more such intensity changes can be produced by altering the device in an obvious manner.

While one version of the device is herein shown and described, it is understood that numerous variations and modifications may be resorted to without departing from the spirit and scope of the invention disclosed.

What I therefore claim and desire to cover by letters patent is:

1. A light intensity control for Christmas tree lighting including in combination connector means for connecting said control to a power supply source, an electrical outlet continuously in circuit with said power supply connector means for connecting thereto one or more strings of Christmas tree lights, voltage dropping resistor means forming a part of said control and electrically connected in series with said outlet for reducing the voltage to said outlet proportional to the resistance in said circuit, circuit controlling means electrically connected across said resistor means and operable to intermittently short out portions of said resistor means to increase and decrease in predetermined fixed increments, the voltage to said outlet.

2. A light intensity control as claimed in claim 1 wherein the said circuit control is in the form of a motor driven cam operable to move into and out of electrically contacting engagement spring contact members electrically connected at resistance differing positions to said resistor means.

3. A light intensity control as claimed in claim 1 wherein the said intermittent shorting out of portions of said resitor means is effected at predetermined timed intervals and sequence.

4. A light intensity control as claimed in claim 1 wherein the said circuit control means is in the form of a motor driven cam operable to intermittently close, in predetermined timed sequence, shorting circuits connected at resistance differing positions to said resistance means.

5. A light intensity control as claimed in claim 1 wherein at no time is the voltage to said outlet reduced by more than 80%.

6. A light intensity control as claimed in claim 1 including overload circuit breaking means electrically connected between said connector means and said outlet.

7. A light intensity control for Christmas tree lighting including in combination connector means for connecting said control to a power supply source, an electrical outlet continuously in circuit with said power supply connector means for connecting thereto one or more strings of Christmas tree lights, voltage dropping resistors means forming a part of said control and connected to reduce the voltage to said outlet, a motor drive, contact members electrically connected at resistance differing positions to said resistor means and movable by said motor drive electrically together to intermittently short out in predetermined time sequence portions of said resistor means to alter in predetermined fixed increments the voltage to said outlet.

8. A light intensity control as claimed in claim 7 wherein the motor drive includes a movable cam operative, when driven by said drive, to move said contact members into and out of resistor shorting position in predetermined timed sequential relation.

9. A light intensity control as claimed in claim 7 wherein the voltage dropping resistor means connected in series with said outlet does not reduce the voltage to said outlet by more than 80%.

10. A light intensity control as claimed in claim 7 wherein overload circuit interrupting means is electrically interposed between said power supply and said outlet.

11. A light intensity control for christmas tree lighting including in combination connector means for connecting said control to a power source, resistor means having at least two differeing fixed voltage outputs, an electrical outlet continuously in circuit with the lowest voltage output of said resistor means for connecting therewith one or more strings of Christmas tree lights, means movable for intermittently connecting in common with the said lowest voltage output the other outputs of said resistor means in predetermined sequence and in the order required to successively increase the voltage to said outlet.

12. A light intensity control as claimed in claim 11 wherein the said means movable is in the form of a motor driven cam operative to intermittently move together, into and out of common electrical engagement, spring contact members respectively connected to the outputs of said power supply.

13. A light intensity control as claimed in claim 11 wherein a circuit interrupting thermal overload is electrically interposed between said power supply and said outlet.

14. A light intensity control as claimed in claim 11 wherein the voltage to said lowest voltage output of said power supply is not less than 30% of the power supply input voltage.

15. A lighting intensity control as claimed in claim 11 wherein said means movable is operable to intermittently disconnect said other outputs from said lowest voltage output as required to successively decrease the voltage to said outlet.

* * * * *